M. D. & N. C. SATTERLEE.
STEERING GEAR.
APPLICATION FILED OCT. 3, 1912.
1,074,748.  Patented Oct. 7, 1913.
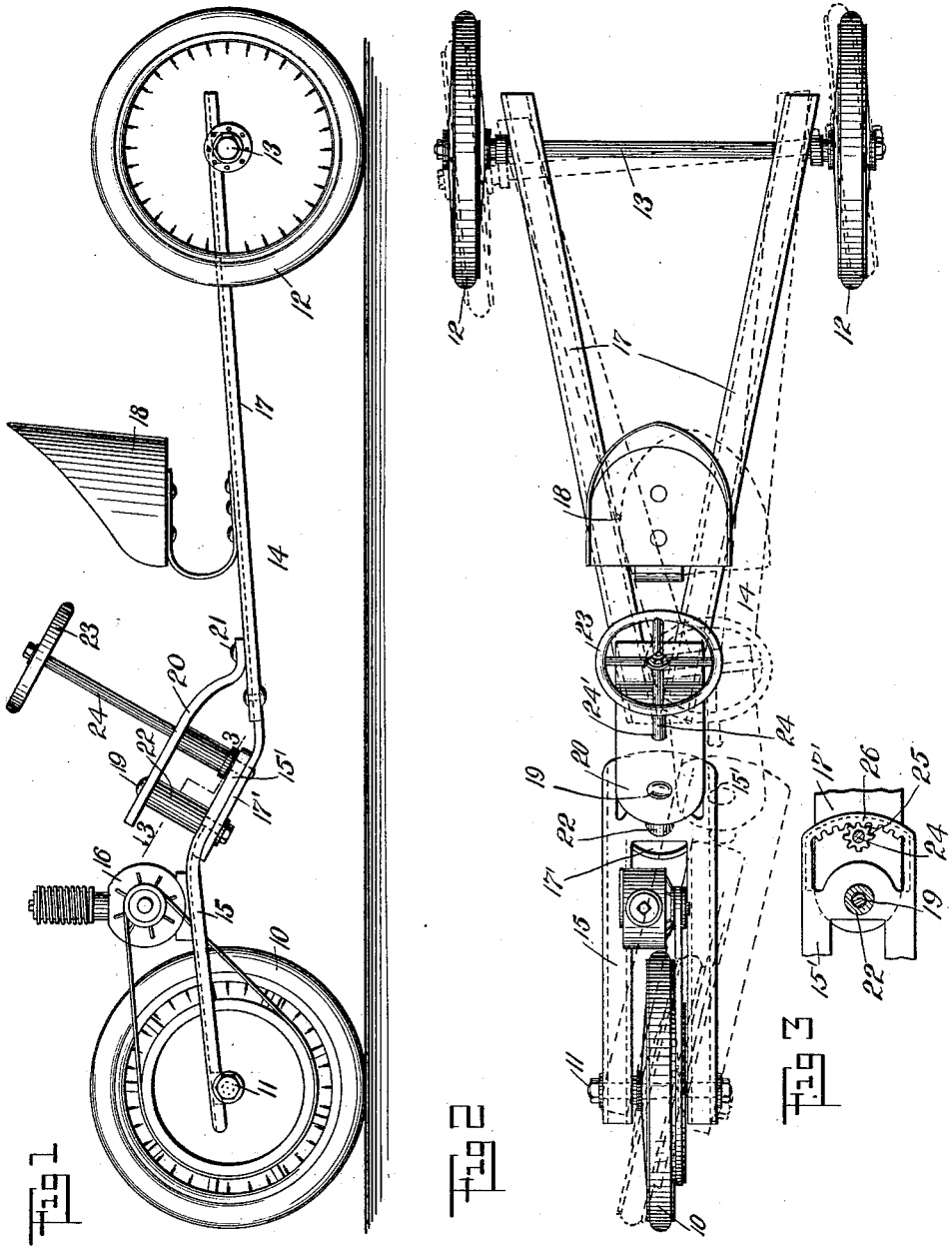
WITNESSES
C. J. Hachenburg.
Geo. L. Beeler
INVENTORS
Marcus D. Satterlee,
Nellis C. Satterlee,
BY Munn & Co.
ATTORNEYS
COLUMBIA PLANOGRAPH CO., WASHINGTON, D. C.

UNITED STATES PATENT OFFICE.

MARCUS D. SATTERLEE, OF ANDOVER, AND NELLIS C. SATTERLEE, OF WILLIAMSFIELD, OHIO.

STEERING-GEAR.

1,074,748. Specification of Letters Patent. Patented Oct. 7, 1913.

Application filed October 3, 1912. Serial No. 723,729.

*To all whom it may concern:*

Be it known that we, MARCUS D. SATTERLEE and NELLIS C. SATTERLEE, both citizens of the United States, and residents, respectively, of Andover, in the county of Ashtabula and State of Ohio, and of Williamsfield, in the county of Ashtabula and State of Ohio, have invented a new and Improved Steering-Gear, of which the following is a full, clear, and exact description.

This invention relates to steering devices for vehicles and has particular reference to a device of the character indicated in which there is employed a frame or reach extending from the front axle to the rear axle and in which reach is formed a joint which is associated with or constitutes a part of the steering devices.

Among the objects of the invention is to construct a steering device which will provide or insure a better control of the vehicle especially on slippery streets than is usual and one which also comprises the least number of parts, for which reason it may be constructed at comparatively low cost and will be more efficient and reliable in service than more complicated devices.

The foregoing general objects of the invention will hereinafter be more fully described and claimed and illustrated in the drawings accompanying this specification in which like characters of reference indicate corresponding parts in all the views, and in which—

Figure 1 is a side elevation of a motor vehicle, shown somewhat diagrammatic and illustrating a preferred embodiment of the invention; Fig. 2 is a plan view of the same; and Fig. 3 is a transverse sectional detail on the line 3—3 of Fig. 1.

Referring particularly to the drawings, we show a motor vehicle or cycle comprising a front wheel 10 mounted on an axle 11 and a pair of rear wheels 12 journaled on an axle 13. We wish it to be understood, however, in this connection, that the number and arrangement of the wheels may be varied without departing from the spirit of the steering apparatus herein disclosed. The frame 14 of the cycle is or may be of a simple and practically unitary construction made in two parts, however, and jointed together intermediate the axles 11 and 13 between which the frame extends. As shown, we prefer to construct the frame, for convenience of description hereinafter specified as the "reach," in two parts,—the front part 15 constituting a support for the driving mechanism 16, and the rear part 17 constituting a support for the seat 18. The reach parts 15 and 17 preferably overlap each other and the overlapped portions are bent so that the plane through which the pivot 19 passes at a right angle will be inclined forwardly and upwardly.

The rear portion 17 of the reach is shown as being bifurcated, but this will be understood as being incidental to the use of two rear wheels and it will be understood also that the exact form of either of the reach portions will be determined by the arrangement and number of the several wheels. The front upwardly bent portion 17' of the rear reach section constitutes a bearing for the rear downwardly deflected portion 15' of the other section, as shown especially in Fig. 1. Said deflected parts of the reach sections are journaled permanently together by means of the pivot 19 which passes through a brace 20 rigidly secured at 21 to the rear section 17 and also through a thimble 22 which constitutes a spacer between the brace 20 and the front portion of the reach. Said thimble is preferably rigidly connected to the said front part of the reach, and it, in connection with the brace and pivot, constitutes a means to resist all tendencies to distort the reach in vertical planes.

Any suitable means may be employed to turn the reach sections relatively to each other around the pivot 19 either singly or together, whereby the front and rear wheels will be caused to assume an angular relationship. As herein shown, we provide a steering wheel 23 connected to a staff 24, the lower end of which is journaled at 24' in the brace 20 and also preferably in the extension 17' of the rear part of the reach. Adjacent its lower end the staff 24 has secured to it a pinion 25 in mesh with a rack 26 formed on the rear extension 15' of the front part of the reach and curved on the arc of a circle of which the axis of the pivot 19 is the center. Rotation of the wheel 23 and the connected parts 24 and 25 will cause a corresponding steering effect upon the vehicle; that is to say, the turning of the hand wheel 23 in a clockwise direction will cause the machine to be steered to the right due to the form and arrangement of the rack and pinion with respect to the main pivot 19. The deflected portions 15′ and 17′ of the reach in association with the pivot 19 will cause the front axle 11 to be tilted when the reach is deflected laterally with the corresponding result of the canting of the front wheel, an element of advantage with respect to strength and stability of the vehicle in making a turn. It is to be noted, furthermore, that the peculiar construction and arrangement of the steering devices will act simultaneously upon both the front and the rear wheels; that is to say, while the front portion 15 of the reach is turned in the act of steering, the rear portion 17 will be turned simultaneously in a corresponding direction, causing the rear wheels to assume a position at an angle to the line of movement of the vehicle so as to assist in or multiply the steering effect, as shown in dotted lines in Fig. 2.

By mounting the motor 16 upon the front part of the reach and belting the same to the front wheel, a direct driving effect is realized which is found to be superior in practice to driving of the rear wheels only, and, furthermore, the motor is thus positioned most conveniently for observation and control thereof by the driver of the device seated in the rear thereof.

The several parts of the device may be made of any suitable materials and the relative sizes and proportions thereof may be varied to a considerable extent without departing from the spirit of the invention hereinafter claimed.

Having thus described our invention, we claim as new and desire to secure by Letters Patent:—

1. In a motor vehicle, the combination of front and rear axles, wheels supporting said axles, a two-part reach extending between the axles and constituting the frame of the vehicle, the two parts of the reach overlapping each other, a brace connected to one part and extending thence along the same parallel and in spaced relation thereto, the overlapping portion of the other reach part lying between said brace and the part to which the brace is connected, a thimble extending from the brace to the overlapping reach parts, a pivot passing through the brace, thimble and reach parts, a steering arc being formed upon the intermediate reach part, and a steering shaft journaled in said brace and opposite reach part and having a pinion meshing with said arc, substantially as set forth.

2. In a motor vehicle, the combination of front and rear axles, wheels supporting said axles, a reach extending between said axles and constituting the frame of the vehicle, said reach being jointed intermediate its ends, the parts thereof at the joint being inclined from the horizontal plane and overlapping each other, a brace connected to one reach part and extending in spaced relation to said overlapping parts, a pivot passing through said overlapped portions and said brace and extending at a right angle to said inclined parts, and means associated with said reach and acting upon said overlapped portions thereof to cause the front and rear portions of the reach to assume angular relations.

3. In a motor vehicle, the combination of front and rear axles, wheels supporting said axles, a reach extending between the axles constituting the frame of the vehicle, one portion of the reach being bent upwardly at one end, a brace connected to said reach portion and extending thence at its other end parallel to said upwardly bent portion, the other reach portion having a downwardly bent portion coöperating with the upwardly bent portion of the other reach portion, a thimble between the brace and the bent reach portions, a pivot extending through said brace, thimble and reach portions, and means to cause the reach portions to be deflected laterally around the axis of said pivot.

In testimony whereof we have signed our names to this specification in the presence of two subscribing witnesses.

MARCUS D. SATTERLEE.
NELLIS C. SATTERLEE.

Witnesses:
ELLA J. HILL,
MAY FRENCH.

---

Copies of this patent may be obtained for five cents each, by addressing the "Commissioner of Patents, Washington, D. C."